United States Patent

Miyake et al.

(10) Patent No.: US 7,397,632 B2
(45) Date of Patent: Jul. 8, 2008

(54) SOFT MAGNETIC THIN FILM AND MAGNETIC RECORDING HEAD

(75) Inventors: Yuko Miyake, Kawasaki (JP); Masaya Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 156 days.

(21) Appl. No.: 11/154,181

(22) Filed: Jun. 16, 2005

(65) Prior Publication Data

US 2006/0215315 A1 Sep. 28, 2006

(30) Foreign Application Priority Data

Mar. 23, 2005 (JP) .............................. 2005-084935

(51) Int. Cl.
G11B 5/127 (2006.01)
G11B 5/235 (2006.01)
G11B 5/147 (2006.01)

(52) U.S. Cl. ............................ 360/125.12; 360/119.01

(58) Field of Classification Search ................. 360/125, 360/126, 120, 125.08, 125.12, 125.24, 125.26, 360/125.58, 125.63, 119.01
See application file for complete search history.

(56) References Cited

U.S. PATENT DOCUMENTS

| | | | | |
|---|---|---|---|---|
| 5,001,018 A | * | 3/1991 | Takada et al. | 428/611 |
| 5,780,177 A | * | 7/1998 | Tomita et al. | 428/812 |
| 6,765,757 B2 | | 7/2004 | Kawasaki et al. | |
| 7,106,554 B2 | * | 9/2006 | Guan et al. | 360/125 |
| 2003/0189786 A1 | | 10/2003 | McGreehin et al. | |
| 2004/0166369 A1 | * | 8/2004 | Shintaku et al. | 428/692 |
| 2005/0053802 A1 | | 3/2005 | Miyake et al. | |
| 2005/0064244 A1 | * | 3/2005 | Shintaku et al. | 428/694 TS |

FOREIGN PATENT DOCUMENTS

| | | | |
|---|---|---|---|
| EP | 766272 A1 * | 4/1997 | |
| JP | 01007312 A * | 1/1989 | |
| JP | 02069906 A * | 3/1990 | |
| JP | 04195809 A * | 7/1992 | |
| JP | 11-154609 | 6/1999 | |
| JP | 11213332 A * | 8/1999 | |
| JP | 11283216 A * | 10/1999 | |
| JP | 2000208355 A * | 7/2000 | |
| JP | 2002-280217 | 9/2002 | |
| JP | 2003332125 A * | 11/2003 | |
| JP | 2004-127479 | 4/2004 | |
| JP | 2005-086012 | 3/2005 | |
| WO | WO 03096359 A1 * | 11/2003 | |

* cited by examiner

Primary Examiner—William J Kilmowicz
(74) Attorney, Agent, or Firm—Greer, Burns & Crain, Ltd.

(57) ABSTRACT

The soft magnetic thin film has high saturation magnetic flux density and good soft magnetic characteristics. The soft magnetic thin film of the present invention is formed by electrolytic plating. The plated film is made of FeCo, whose composition is indicated as FexCo1-x ($60 \leq x \leq 75$ wt %), the FeCo film has a bcc crystal structure, and the crystal of the FeCo film is oriented to a crystal face of (110).

5 Claims, 5 Drawing Sheets

SOFT MAGNETIC THIN FILM AND MAGNETIC RECORDING HEAD

BACKGROUND OF THE INVENTION

The present invention relates to a soft magnetic thin film and a magnetic recording head using the same.

In a magnetic recording head for a hard disk, an upper magnetic pole has thickness of 3-4 μm and a step-shaped part so as to generate enough magnetic fluxes at a front end. Therefore, the upper magnetic pole is formed by a plating method, which has high deposition efficiency and which is good for selective film formation.

To improve recording density, a material having high saturation magnetic flux density (Bs) is required for a material of magnetic poles of the recording head.

A process of producing a plated film made of a FeCo alloy having high Bs and its characteristics are disclosed in Japanese Patent Gazette No. 2002-280217 (Doc. 1).

In Japanese Patent Gazette No. 2004-127479A (Doc. 2), a base layer made of Ru is used so as to improve soft magnetic characteristics of a FeCoNi alloy.

Further, in Japanese Patent Gazette No. 2005-86012 (Doc. 3), intensity ratio of bcc (211) and bcc (110) is controlled so as to improve soft magnetic characteristics of a FeCo alloy film having Bs>2.3 T (T: tesla).

The Bs of the plated film of Doc. 1 is greater than that of conventional ones, but magnetostriction is great. Therefore, it is difficult to improve soft magnetic characteristics, and a coercive force is great. If the coercive force is great, high frequency response is made worse. Thus, the coercive force must be minimized.

In Doc. 2, the FeCoNi alloy includes Ni, so the Bs of the plated film is reduced to less than 2.3 T. Therefore, a soft-magnetized FeCo alloy having the Bs of 2.3 T or more is required.

In Doc. 3, the Bs is 2.3 T or more, but a NiFe material is required as a base layer. Further, it is difficult to control crystal orientation due to narrow margins.

SUMMARY OF THE INVENTION

The present invention has been invented to solve the problems of the conventional technologies.

An object of the present invention is to provide a soft magnetic thin film, in which a nonmagnetic electric conductive material and a magnetic electric conductive material can be used as a base layer of plating, which can deal with variations of mass production and which has high Bs and good soft magnetic characteristics.

Another object is to provide a magnetic recording head, in which the soft magnetic thin film of the present invention is used as a magnetic material, having superior recording characteristics.

To achieve the objects, the present invention has following structures.

Namely, the soft magnetic thin film of the present invention is formed by electrolytic plating, wherein the plated film is made of FeCo, whose composition is indicated as FexCo1-x (60≦x≦75 wt %), the FeCo film has a bcc crystal structure, and the crystal of the FeCo film is oriented to a crystal face of (110).

In the soft magnetic thin film, the plated film is formed on a nonmagnetic electric conductive base layer.

In another case, the plated film is formed on a magnetic electric conductive base layer, and the base layer is made of an alloy including at least two elements selected from Fe, Co and Ni.

In the soft magnetic thin film, sheet resistance of the base layer may be 5.3 Ω/cm² or less.

In the soft magnetic thin film, a single appressed layer, which is made of Ta, Ti, Cr or Nb, may be formed under the base layer.

The magnetic recording head of the present invention comprises: a lower magnetic pole; an upper magnetic pole being formed above the lower magnetic pole; an insulating layer being formed between the lower magnetic pole and the upper magnetic pole; a back gap section being formed at a rear end, the back gap section contacting the lower magnetic pole and the upper magnetic pole; a magnetic gap section being formed at a front end so as to face a surface of a recording medium; a coil being wound on the back gap section a plurality of times; and a soft magnetic thin film, which is formed by electrolytic plating, being formed in the upper magnetic pole and close to the magnetic gap section, wherein the soft magnetic film is made of FeCo, whose composition is indicated as FexCo1-x (60≦x≦75 wt %), the FeCo film has a bcc crystal structure, and the crystal of the FeCo film is oriented to a crystal face of (110).

In the magnetic recording head, the magnetic gap section is a nonmagnetic electric conductive layer, and the soft magnetic thin film is formed on the nonmagnetic electric conductive layer.

Further, a single magnetic pole head for vertical magnetic recording comprises: a main magnetic pole; a return yoke; an insulating layer being formed between the main magnetic pole and the return yoke; a back gap section being formed at a rear end, the back gap section contacting the main magnetic pole and the return yoke; a nonmagnetic electric conductive layer being formed on both sides of a front end of the main magnetic pole, which faces a surface of a recording medium; and a trailing shield being formed at a front end of the return yoke, which faces the surface of the recording medium, wherein at least one of the main magnetic pole and the trailing shield is a soft magnetic thin film, which is formed, by electrolytic plating, on the nonmagnetic electric conductive layer, the soft magnetic film is made of FeCo, whose composition is indicated as FexCo1-x (60≦x≦75 wt %), the FeCo film has a bcc crystal structure, and the crystal of the FeCo film is oriented to a crystal face of (110).

In the present invention, a coercive force of the FeCo plated film, whose saturation magnetic flux density (Bs) is maintained 2.3 T or more, can be reduced to less than 317 A/m. On the other hand, the soft magnetic thin film having high magnetic permeability, e.g., μ≈700, can be realized. By using the soft magnetic thin film as a magnetic pole material, high frequency response of the recording head can be highly improved, so that recording characteristics can be improved. Especially, in case of using the soft magnetic thin film for a horizontal recording head, by combining with the nonmagnetic base film, a manufacturing process of the recording head can be simplified, amount of carving the upper magnetic pole, which is equal to thickness of a spattered magnetic material, can be reduced so that a core can be precisely formed. In case of using the soft magnetic thin film for the main magnetic pole of the vertical recording head, the main magnetic pole can be formed by a plating method for mass production. The trailing shield is formed by plating only due to a shape and an aspect ratio. However, in the vertical recording head of the present invention, a manufacturing process can be simplified, and rejection rate of products can be reduced. Further, by using the material having the high Bs and high magnetic permeability μ, recording resolution of the single magnetic pole head for vertical magnetic recording can be improved.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

Figure 1:
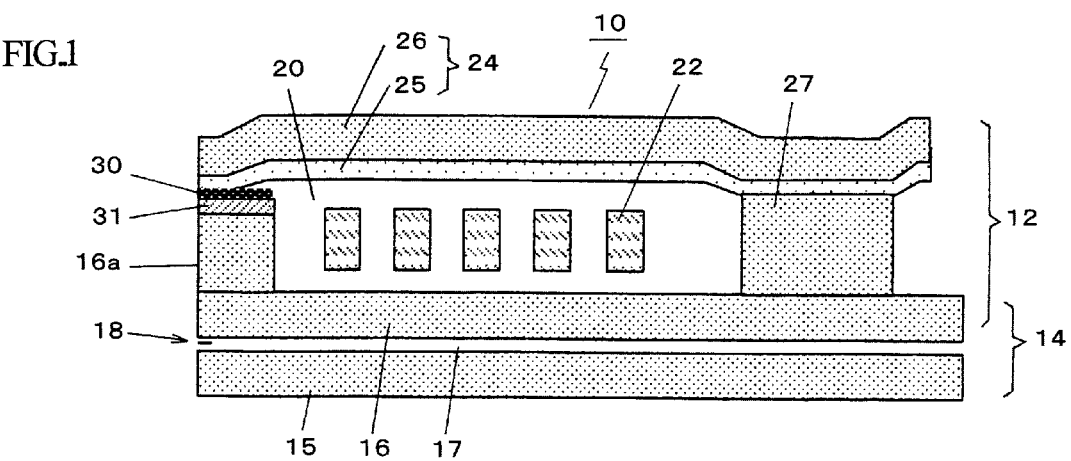
FIG. 1 is a schematic sectional view of a horizontal recording head of an embodiment of the present invention.
Figure 2:
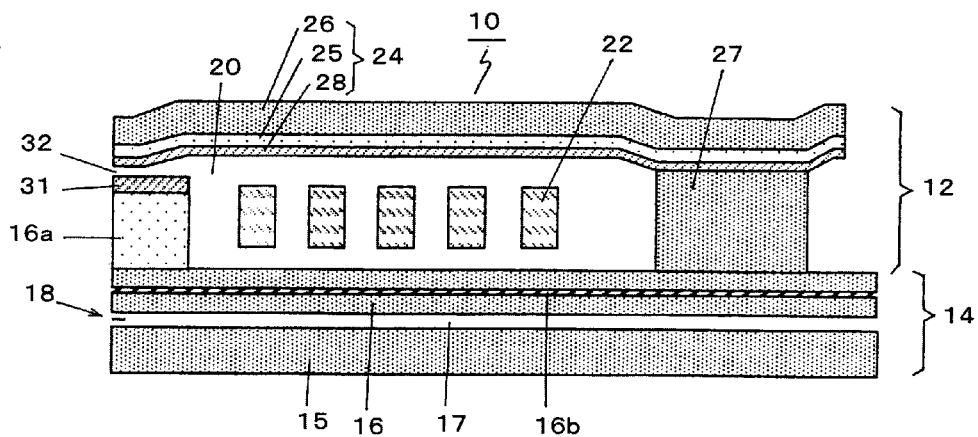
FIG. 2 is a schematic sectional view of a horizontal recording head of another embodiment.
Figure 3:
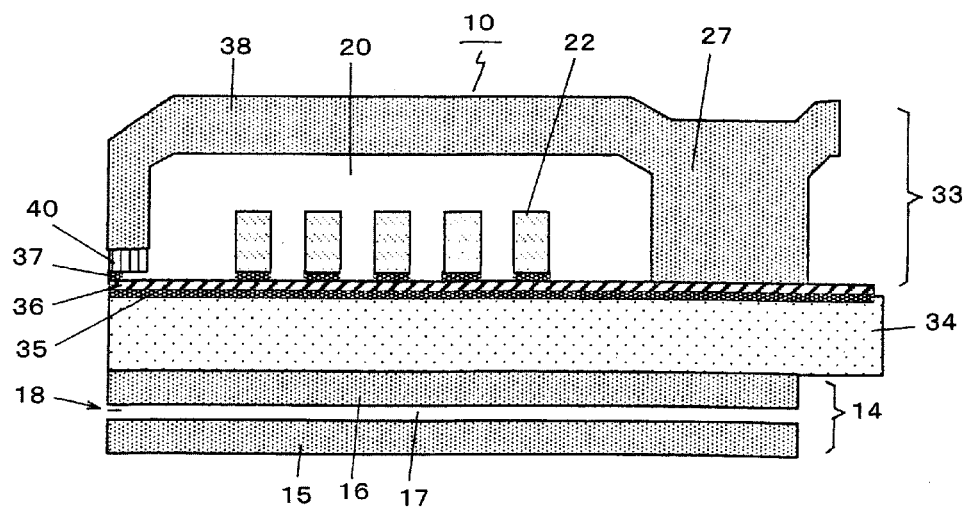
FIG. 3 is a schematic sectional view of a single pole vertical magnetic recording head of other embodiment.

The soft magnetic thin film of the present invention may be applied to magnetic recording heads shown in FIGS. 1-3. The recording heads shown in FIGS. 1 and 2 are flat type heads, but the soft magnetic thin film can be applied to stitched type heads. In each of FIGS. 1 and 2, the soft magnetic thin film is provided in an upper magnetic pole; in FIG. 3, the soft magnetic thin film is provided in a main magnetic pole or a trailing shield.

FIG. 1 is a partial sectional view of the thin film magnetic head 10.

The magnetic head 10 includes a magnetic recording head 12 and a reproducing head 14. Since the magnetic head 10 has a known structure, so it will be briefly explained.

The reproducing head 14 comprises: a lower shielding layer 15 and an upper shielding layer 16 made of FeNi; an insulating layer 17 made of, e.g., alumina; and a known MR element 18 provided in the insulating layer 17.

The upper shielding layer 16 acts as a lower magnetic pole of the recording head 12.

An insulating layer 20, which is made of, for example, alumina, is formed on the lower magnetic pole 16, a coil 22 is formed in the insulating layer 20, and a two-layered upper magnetic pole 24 is formed on the insulating layer 20. The upper magnetic pole 24 is constituted by a FeCo plated layer 25 and a FeNi plated layer 26 formed on the plated layer 25. The layers 25 and 26 relates to the present invention.

A back gap section 27, which contacts the lower magnetic pole 16 and the upper magnetic pole 24, is formed at rear end of the magnetic recording head 12. The coil 22 is wound on the back gap section 27 a plurality of times. A magnetic gap (write-gap) section 30, which faces a surface of a recording medium (not shown), is formed at a front end of the magnetic recording head 12. A high Bs layer 31, which is made of a material whose Bs is higher than that of the lower magnetic pole 16, e.g., FeCo, is formed between a front end layer 16a of the lower magnetic pole 16 and the magnetic gap section 30 by spattering.

In the present embodiment, composition of the plated FeCo layer 25 of the upper magnetic pole 24 is indicated as FexCo1-x (60≦x≦75 wt %). Further, the FeCo layer 25, which is formed by electrolytic plating, is a soft magnetic thin film having a bcc crystal structure, and a crystal of the FeCo layer 25 is oriented to a crystal face of (110).

The magnetic gap section 30 is a nonmagnetic electric conductive layer made of, for example, Ru, and the FeCo layer (the soft magnetic thin film) 25 of the upper magnetic pole 24 is formed on the magnetic gap section 30. Namely, the magnetic gap section 30 is a base layer of the FeCo layer 25.

The nonmagnetic electric conductive layer of the magnetic gap section 30 acts as an electric power supply layer when the upper magnetic pole 24 is formed by electrolytic plating. Crystal orientation of the FeCo plated layer 25 can be controlled by selecting a material of the nonmagnetic electric conductive layer.

FIG. 2 is a partial sectional view of another thin film magnetic head 10. Structural elements shown in FIG. 1 are assigned the same symbols, and explanation will be omitted.

In FIG. 2, a magnetic gap section 32, which is made of an insulating material, e.g., $Al_2O_3$, $SlO_2$, is formed on a high layer 31. The upper magnetic pole 24 comprises: a plating base layer 28 made of a magnetic electric conductive material; the FeCo layer 25 plated by electrolytic plating, in which the base layer 28 acts as an electric power supply layer; and the FeNi plated layer 26.

In this embodiment too, composition of the plated FeCo layer 25 is indicated as FexCo1-x (60≦x≦75 wt %). Further, the FeCo layer 25, which is formed by electrolytic plating, is a soft magnetic thin film having a bcc crystal structure, and a crystal of the FeCo layer 25 is oriented to a crystal face of (110).

Note that, a symbol 16b stands for a magnetic separation layer.

FIG. 3 is a partial sectional view of a thin film magnetic head 10 having a single magnetic pole head 33 for vertical magnetic recording. Structural elements shown in FIGS. 1 and 2 are assigned the same symbols, and explanation will be omitted.

In FIG. 3, a nonmagnetic electric conductive layer 35 is formed on an insulating layer 34, and a main magnetic pole 36, which is a FeCo plated layer, is formed on the nonmagnetic electric conductive layer 35 by plating. Note that, the nonmagnetic electric conductive layer 35 acts as an electric power supply layer when the main magnetic pole 36 is formed. A nonmagnetic electric conductive layer 37 is formed on the main magnetic pole 36. A trailing shield 40, which is a FeCo plated layer, is formed at a front end of a return yoke 38, which faces a surface of a recording medium (not shown). The nonmagnetic electric conductive layer 37 acts as a plating base layer when the trailing shield 40 is formed. Note that, the trailing shield 40 should be formed in a head, which has great magnetic gradient and records data with high recording density. Depending on the recording density, the trailing shield 40 may be omitted. FIG. 3 shows the single magnetic pole head having the trailing shield, but the soft magnetic thin film of the present invention may be applied to a single magnetic pole head having no trailing shield.

In this embodiment, composition of the plated FeCo layer of at least one of the main magnetic pole 36 and the trailing shield 40 is indicated as FexCo1-x (60≦x≦75 wt %). Further, the FeCo layer, which is formed by electrolytic plating, is a soft magnetic thin film having a bcc crystal structure, and a crystal of the FeCo layer 25 is oriented to a crystal face of (110).

Figure 4:
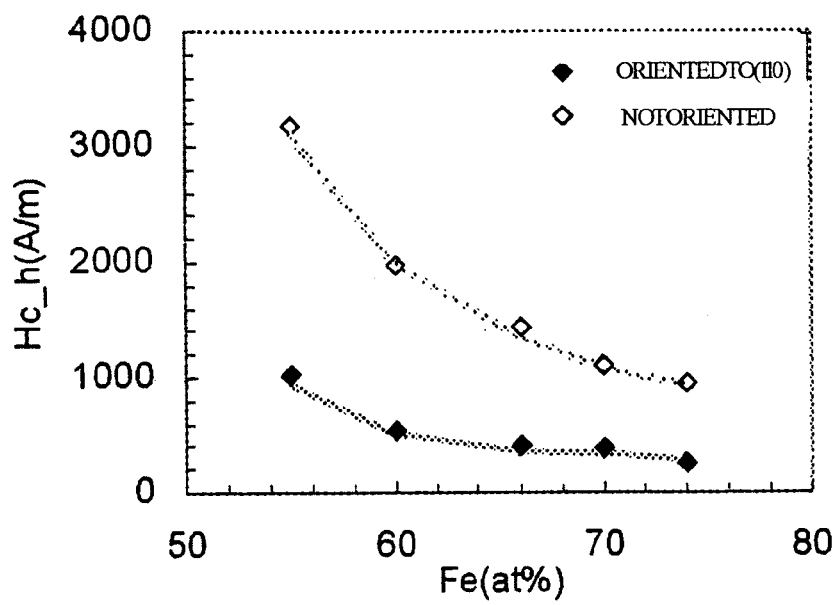
FIG. 4 is graphs of composition dependency of coercive forces of FeCo plated films.
Figure 5:
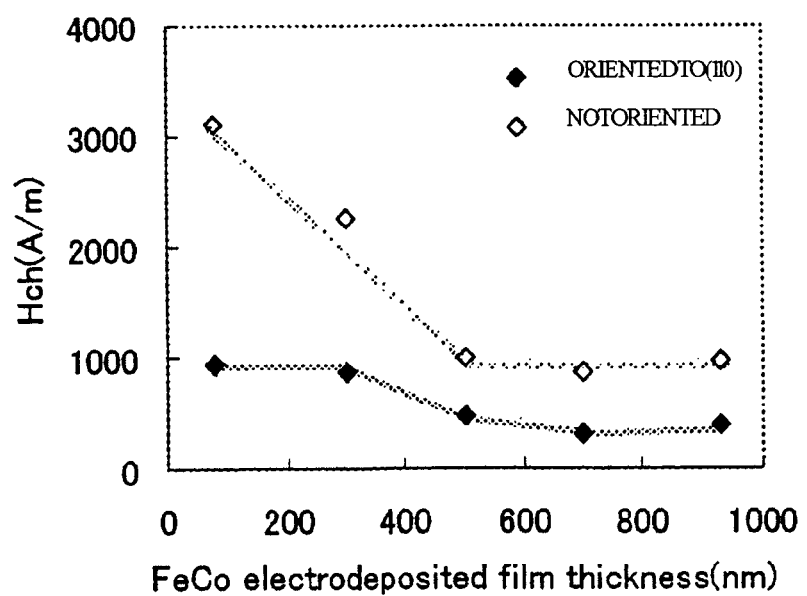
FIG. 5 is graphs of thickness dependency of coercive forces of the FeCo plated films.

Magnetic characteristics of soft magnetic thin films, which were formed by electrolytic plating, which had bcc crystal structures and whose crystals were oriented to crystal faces of (110), are shown in FIGS. 4 and 5. FIG. 4 shows variation of coercive forces (Hc) with respect to compositions of the FeCo plated films; FIG. 5 shows variation of Hc with respect to thickness of the FeCo plated films. According to FIG. 4, the FeCo plated films, whose crystals were oriented to crystal faces of (110), had small coercive forces in wide composition ranges.

Figure 6:
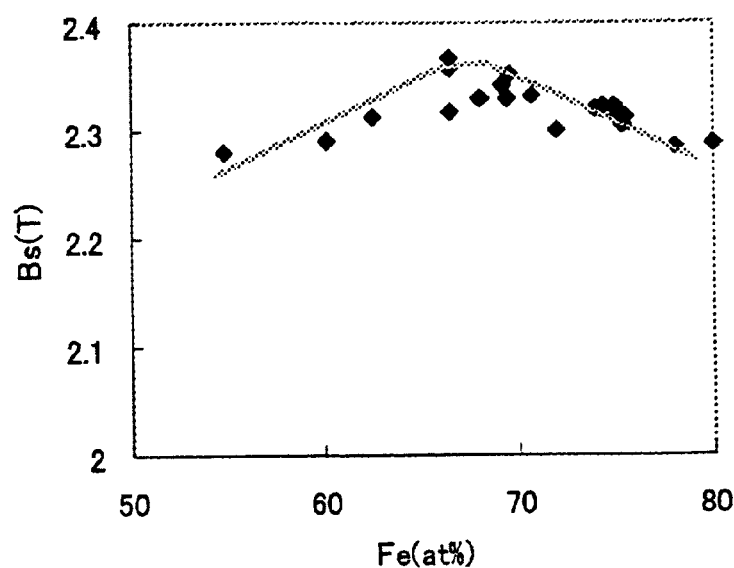
FIG. 6 is graphs of composition dependency of saturation magnetic flux density of the FeCo plated films.

FIG. 6 is graphs of composition dependency of saturation magnetic flux density (Bs) of the FeCo plated films. According to FIG. 6, the FeCo plated films having high Bs, e.g., Bs≧2.3 T, were gained in a composition range of 60 wt %≦Fe≦75 wt %. Therefore, the composition range, in which the coercive force Hc can be made smaller by controlling crystal orientation, fully includes the required range.

According to FIG. 5, by performing the crystal orientation control in the direction of film thickness, the small coercive forces Hc were maintained from the beginning to the completing the film formation. Therefore, the coercive force can be reduced with maintaining high Bs, so that soft magnetic characteristics can be improved and the magnetic head having superior high frequency response can be produced.

Figure 7:
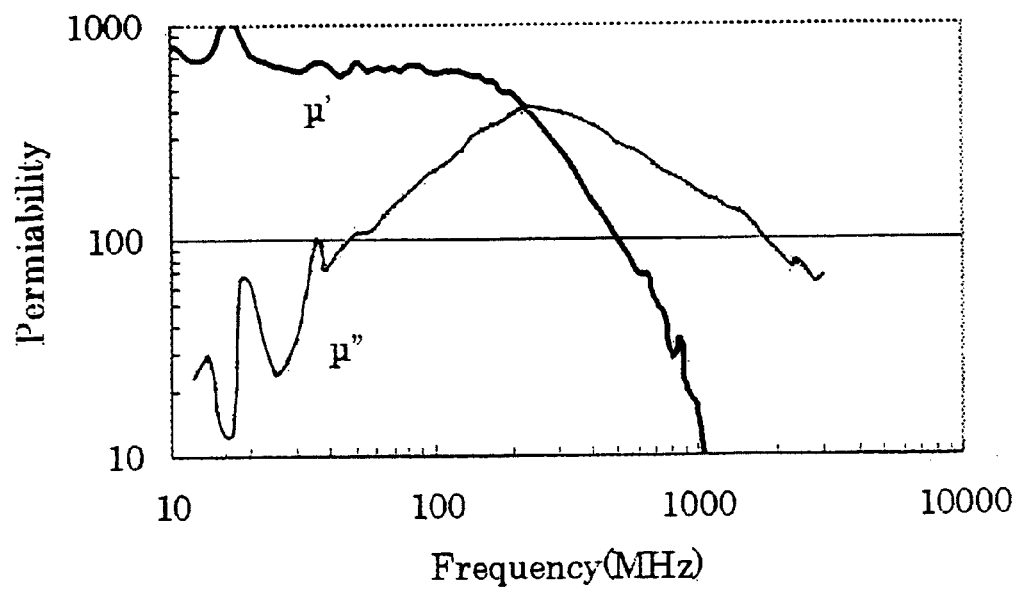
FIG. 7 is graphs of high frequency magnetic permeability of the FeCo plated films.

According to FIG. 7, the FeCo plated films, whose crystals were oriented to crystal faces of (110) and whose coercive forces Hc were made small, had high magnetic permeability, e.g., μ≈700. Therefore, the upper magnetic pole can be formed by a single FeCo layer, and the FeCo plated films may be applied to the trailing shield of the single magnetic pole head for vertical magnetic recording.

Crystal orientation of the FeCo films can be controlled by selecting materials of seed layers (the plating base layers 28, 30, 35 and 37). A suitable plating base layer is made of a nonmagnetic electric conductive material, which is a noble metal, e.g., Ru, Rh, Pt, or an alloy including the noble metal, or a magnetic electric conductive material, which is an alloy including at least two elements selected from Fe, Co and Ni.

Figure 8:
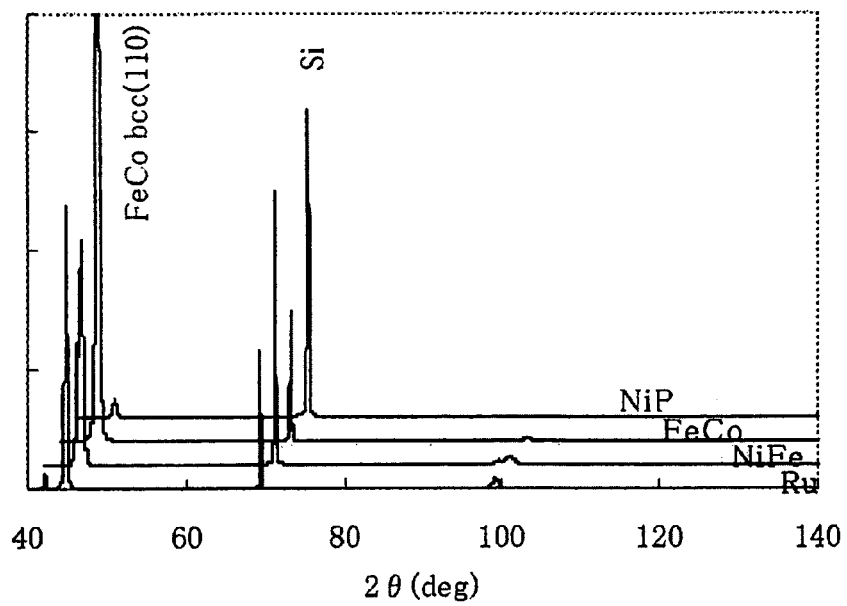
FIG. 8 is X-ray diffraction peaks of the FeCo plated films.

FIG. 8 is X-ray diffraction peaks of the FeCo plated films having different base layers. The base layers were made of NiP, FeCo, NiFe and Ru. Other electric conductive materials had the same tendency. According to FIG. 8, the diffraction peaks of bcc(100) of XRD were remarkably different on the basis of the materials of the base layers. Since a range of the vertical axis is large, other weak diffraction peaks are not shown. The films having high diffraction peaks of bcc(100) were nearly perfectly oriented to bcc(100). However, some films having low diffraction peaks were not randomly oriented.

Figure 9:
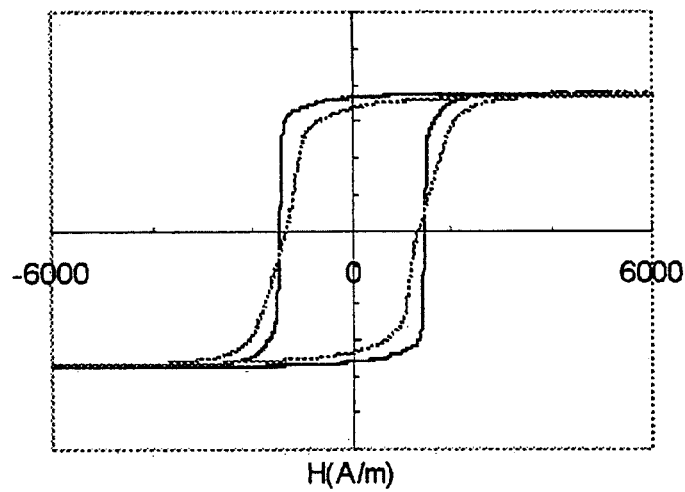
FIG. 9 is graphs of B-H curves of FeCo pulse-plated films, in which crystals are not oriented to bcc (110)
Figure 10:
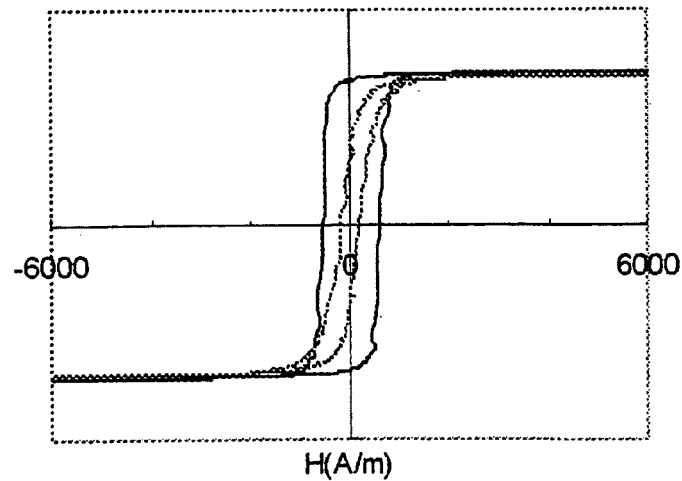
FIG. 10 is graphs of B-H curves of FeCo pulse-plated films, in which crystals are oriented to bcc (110)

FIGS. 9 and 10 are graphs of B-H curves of the FeCo films. In FIG. 9, the FeCo films had the base layers made of NiP; in FIG. 10, the FeCo films had the base layers made of Ru. In the FeCo films whose base layers and crystal orientations were different, the B-H curves were different. In the FeCo films having the NiP base layer, the crystal orientations were not controlled, so that the B-H curves were isotropic and coercive forces Hc were not fully small. On the other hand, in the FeCo films having the Ru base layer, crystals were oriented to bcc(100), so that the coercive forces Hc of the B-H curves in the easy axis and the difficult axis could be reduced.

When the FeCo plated film, in which a nonmagnetic electric conductive film is used as the base layer and crystals are oriented to bcc(100), is applied to a head for horizontal magnetic recording, the nonmagnetic electric conductive base layer (seed layer) acts as a magnetic recording gap layer, so that the head has following advantages. Namely, a manufacturing process can be simplified, amount of trimming an upper magnetic pole can be reduced, adherence of a magnetic layer can be prevented, width of a core can be precisely controlled, etc.

In the case of applying the FeCo plated film, whose crystals are oriented to bcc(100), to the main magnetic pole of the single pole head for vertical magnetic recording, no material of the base layer (seed layer) adheres on the main magnetic pole when the base layer is removed. Therefore, the main magnetic pole can be maintained the desired shape. In the case of applying the FeCo plated film, whose crystals are oriented to bcc(100), to the trailing shield of the single pole head for vertical magnetic recording, no material of the base layer adheres on the trailing shield when the base layer is removed. Therefore, the trailing shield can be maintained the desired shape, and electric short can be prevented. Further, the FeCo plated film can act as not only the trailing shield but also a base layer of the coil (see FIG. 3).

The material of the trailing shield should have high magnetic permeability μ and high saturation magnetic flux density Bs. By orienting crystals to bcc(100), the soft magnetic characteristics can be improved so that the magnetic permeability can be made higher. Therefore, a desired trailing shield can be produced, and recording resolution of the single pole head for vertical magnetic recording can be improved. Note that, in case of using a base layer made of a magnetic material as well as the conventional head, a plated film can be soft-magnetized by controlling crystal orientation. But the plated film can be manufactured by conventional process. Therefore, head characteristics can be improved without changing the conventional manufacturing process.

Successively, a method of manufacturing the FeCo alloy thin film will be explained.

Figure 11:
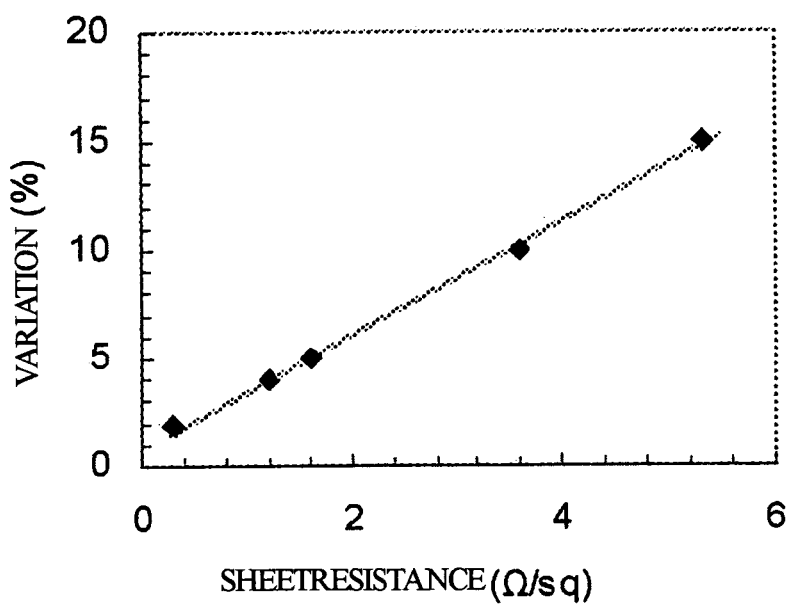
FIG. 11 is a graph of showing a relationship between plating thickness and sheet resistance.

A substrate is made of, for example, $Al_2O_3$—TiC. A plating base layer made of a nonmagnetic electric conductive material is formed on the substrate by spattering or evaporation. To tightly adhere on the substrate, a Ti film, whose thickness is 5-10 nm, is formed on the substrate. Ta, Cr, Nb, etc. may be used instead of Ti. Thickness of the base layer is defined on the basis of sheet resistance, which influences distribution of the plated film. The sheet resistance relates to specific resistance of metals. To reduce sheet resistance, thickness of a plated film, which is made of a metal having great resistance, must be thicker. A graph of a relationship between plating thickness and sheet resistance is shown in FIG. 11. Variation of film thickness depends on a manufacturing process. For example, if the plated film is used in the main magnetic pole of the single pole head for vertical magnetic recording, the variation should be limited within ±5%. Thus, the sheet resistance should be 1.6 Ω/sq or less. In case of using the plated film for an inductive head, the desired variation is ±5%. If small variation can be ignored, the sheet resistance can be increased. For example, if Ru is used, the plated film, whose thickness is 50 nm or more, can be applied to the inductive head, and the main magnetic pole and the trailing shield of the single pole head for vertical magnetic recording.

Composition of a plating solution is shown in TABLE 1, and conditions for forming the film are shown in TABLE 2.

TABLE 1

| REAGENTS | CONCENTRATION (g/l) |
|---|---|
| FLUOBORIC ACID | 8-40 |
| ELECTRIC-CONDUCTING AGENT | 4-60 |
| FERROUS SULFATE | 5-25 |
| COBALT SULFATE | 3-25 |
| STERSS RELIEVING AGENT | 0.2-3 |
| SURFACE ACTING AGENT | 0-1 |

TABLE 2

| CONDITIONS FOR FORMING FILM | |
|---|---|
| TEMPERATURE OF SOLUTION | 20-35 |
| pH | 2.0-3.0 |
| AVERAGE CURRENT DENSITY | 3-25 |
| DUTY RATIO | 5-75 |
| FREQUENCY | 0.1-50 |

To supply Co ions and Fe ions, the plating solution includes hydrosulfates of Co and Fe, fluoboric acid, a electric-conducting agent and a stress relieving agent. The stress relieving agent is an organic matter, whose structure includes [=C—SO2—] and [—C—N—], e.g., saccharin sodium. Further, other matters, whose structures include [=C—SO2—] and exclude [—N—], e.g., 3-sodium naphthalene-1,3,6-trisulfonate, 2-sodium naphthalene-1,5-disulfonate a be added to the FeCo plating solution. But, stress relieving effect of the organic matter, whose structure includes [=C—SO2—] and [—C—N—], is greater, so the organic matter is suitable as an additive agent. Amount of the stress relieving agent in the film is varied by its own chemical adsorbability and supplementary function of the ions in the plating solution. For example, if ions including nitrogen, e.g., ammonium ions, exist in the solution, chemical adsorbability of nitrogen accelerates to incorporate the stress relieving agent with the film. Especially, the incorporation is activated by resist pattern. If the incorporation is excessively accelerated, saturation magnetic flux density Bs is lowered, so that characteristics of the film must be worse. When the organic matter, whose structure includes [=C—SO2—] and [—C—N—], is used as the stress relieving agent, a suitable electric-conducting agent should be selected. The suitable electric-conducting agents are chloride salts, in which cations are alkali metals, hydrosulfates or sulfamic acid salts. For example, sodium chloride, potassium chloride, lithium chloride, sodium sulfate, etc. may be used. In the present embodiment, sodium chloride was used. The FeCo soft magnetic thin film was formed on the $Al_2O_3$—TiC substrate by electrolytic plating. The plating was performed in a direct-current magnetic field of about 8000 e.

The conditions for forming the film will be explained. To improve current efficiency and restrain oxidization of Fe ions, a suitable pH value of the solution is 2.0-3.0. In the present embodiment, the pH value was 2.3. The pH value was adjusted with sulfic acid, but it may be adjusted by hydrochloric acid. To increase the pH value, ammonia may be used. On the other hand, if sodium hydrate is added to the solution, hydroxides immediately deposit in the solution, so sodium hydrate is not a suitable additive.

Pulse current was applied for plating. Average current density was 3-50 mA/cm$^2$, duty cycle was 5-50% and frequency was 0.1-50 Hz. The film can be formed with a direct current, but surface roughness of the film must be great. Surface roughness of the FeCo film plated with the pulse current was smaller than that of the film plated with the direct current. In the FeCo film lated with the pulse current, Ra was ≦5 nm, which was nearly equal to flatness of a NiFe plated film. Temperature of the solution was 15-30° C. If the temperature is too high, oxidization of Fe will be accelerated so that a span of life of the solution must be short. The suitable temperature is 30° C. or less. In the present embodiment, N2 bubbling was performed so as to restrain the oxidization of the solution. Further, a lid of a plating tub should be closed without frequently opening.

In the FeCo plated film, whose composition is indicated as FexCo1-x (60≦x≦75 wt %) without reference to the base layer, the Bs was 2.3 T or more. By orienting crystals to bcc(100), the small coercive force was maintained from the beginning of forming the film until reaching thickness of 1 nm (see FIGS. 4 and 5). As shown in FIG. 7, the coercive force in the difficult axis was reduced, so that the magnetic permeability was increased. The crystal orientation control can be performed by selecting the material of the base layer. Especially, remarkable effect was gained by selecting Ru, Rh, NiFe and FeCo. The material of the base layer is not limited to the above materials. For example, noble metals, e.g., Pd, Pt, Au, Mo, W, may be used as the material of the base layer. However, the materials, whose crystal orientation to bcc(100) can be easily controlled from the beginning to the completing the film and which are capable of highly improving the soft magnetic characteristics, are Ru, Rh, FeCo and FeNi. They are suitable materials of the base layer of the FeCo film. Note that, when the FeCo is used as the base layer, the coercive forces of the FeCo base layer and the FeCo plated layer will be combined, so the coercive force of the FeCo base layer should be small. The above described technology is effective for plated films having the bcc structures, so the Bs may be applied to, for example, FeCo+α (α=Ni, Pd, Ru, Rh, Pt, Zr) so as to improve corrosion resistance. A slight amount of the a is added, and concentration of the a is defined on the basis of the desired Bs. In the present invention, a slight amount of the a may be included in the FeCo plated film.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A single magnetic pole head for vertical magnetic recording,
   comprising:
   a main magnetic pole;
   a return yoke;
   an insulating layer being formed between said main magnetic pole and said return yoke;
   a coil being formed in said insulating layer;
   a nonmagnetic electric conductive layer, which is made of Ru, Rh, Pt, Pd, Au or an alloy thereof, being formed on a front end of said main magnetic pole, which faces a surface of a recording medium; and
   a trailing shield being formed at a front end of said return yoke, which faces the surface of the recording medium,
   wherein at least one of said main magnetic pole and said trailing shield is a soft magnetic film, which is formed, by electrolytic plating, on said nonmagnetic electric conductive layer,
   the soft magnetic film is made of FeCo, whose composition is indicated as FexCo1-x (60≦x≦75 wt %), the FeCo film has a bcc crystal structure, and the crystal of the FeCo film is oriented to a crystal face of (110).

2. A magnetic head for a magnetic recording medium, comprising:

an insulating layer;

a coil being formed in said insulating layer; and a soft magnetic film being provided to a front end part facing the magnetic recording medium, wherein:

said soft magnetic film is formed, by electrolytic plating, on a nonmagnetic electric conductive layer, the nonmagnetic electric conductive layer being made of Ru, Rh, Pt, Pd, Au or an alloy thereof, said soft magnetic film is made of FeCo, whose composition is indicated as $Fe_xCo1-x$ ($60 \leqq x \leqq 75$ wt %), said FeCo film has a bcc crystal structure; and the crystal of the FeCo film is oriented to a crystal face of (110).

3. The magnetic head according to claim 2, further comprising:

a lower magnetic pole; and an upper magnetic pole being formed above said lower magnetic pole, wherein said soft magnetic film is formed in said upper magnetic pole and close to a magnetic gap section, the magnetic gap section is said nonmagnetic electric conductive layer.

4. The magnetic head according to claim 2, further comprising:

a main magnetic pole;

a return yoke;

a trailing shield being formed at a front end of said return yoke, which faces the surface of the recording medium, wherein said nonmagnetic electric conductive layer is formed on a front end of said main magnetic pole, which faces a surface of the recording medium, and at least one of said main magnetic pole and said trailing shield is said soft magnetic film, which is formed, by electrolytic plating, on said nonmagnetic electric conductive layer.

5. The magnetic head according to claim 2, further comprising:

a Bs layer formed on an opposite surface of said nonmagnetic electric conductive layer from said soft magnetic film.

* * * * *

UNITED STATES PATENT AND TRADEMARK OFFICE
CERTIFICATE OF CORRECTION

PATENT NO.        : 7,397,632 B2
APPLICATION NO.   : 11/154181
DATED             : July 8, 2008
INVENTOR(S)       : Miyake et al.

It is certified that error appears in the above-identified patent and that said Letters Patent is hereby corrected as shown below:

On the Title Page:

Column 2 – (57) ABSTRACT - Line 5     Delete "FexCo1-x ($60 \leqq x \leqq 75$ wt %)" and insert --$Fe_xCo_{100-x}$ ($60 \leqq x \leqq 75$wt%)-- in its place.

In the Specification:

Col. 1, Lines 62-63     Delete "FexCo1-x ($60 \leqq x \leqq 75$ wt %)" and insert --$Fe_xCo_{100-x}$ ($60 \leqq x \leqq 75$wt%)-- in its place.

Col. 2, Lines 22-23     Delete "FexCo1-x ($60 \leqq x \leqq 75$ wt %)" and insert --$Fe_xCo_{100-x}$ ($60 \leqq x \leqq 75$wt%)-- in its place.

Col. 2, Line 44     Delete "FexCo1-x ($60 \leqq x \leqq 75$ wt %)" and insert --$Fe_xCo_{100-x}$ ($60 \leqq x \leqq 75$wt%)-- in its place.

Col. 4, Line 10     Delete "FexCo1-x ($60 \leqq x \leqq 75$ wt %)" and insert --$Fe_xCo_{100-x}$ ($60 \leqq x \leqq 75$wt%)-- in its place.

Col. 4, Line 36     Delete "FexCo1-x ($60 \leqq x \leqq 75$ wt %)" and insert --$Fe_xCo_{100-x}$ ($60 \leqq x \leqq 75$wt%)-- in its place.

Col. 5, Line 3     Delete "FexCo1-x ($60 \leqq x \leqq 75$ wt %)" and insert --$Fe_xCo_{100-x}$ ($60 \leqq x \leqq 75$wt%)-- in its place.

Col. 5, Line 50     Delete "bcc(100)" and insert --bcc(110)-- in its place.

Col. 5, Line 53     Delete "bcc(100)" and insert --bcc(110)-- in its place.

Col. 5, Line 54     Delete "bcc(100)" and insert --bcc(110)-- in its place.

Col. 5, Line 66     Delete "bcc(100)" and insert --bcc(110)-- in its place.

Col. 6, Line 3     Delete "bcc(100)" and insert --bcc(110)-- in its place.

UNITED STATES PATENT AND TRADEMARK OFFICE
CERTIFICATE OF CORRECTION

PATENT NO. : 7,397,632 B2
APPLICATION NO. : 11/154181
DATED : July 8, 2008
INVENTOR(S) : Miyake et al.

It is certified that error appears in the above-identified patent and that said Letters Patent is hereby corrected as shown below:

| | |
|---|---|
| Col. 6, Line 13 | Delete "bcc(100)" and insert --bcc(110)-- in its place. |
| Col. 6, Line 19 | Delete "bcc(100)" and insert --bcc(110)-- in its place. |
| Col. 6, Line 29 | Delete "bcc(100)" and insert --bcc(110)-- in its place. |
| Col. 8, Line 12 | Delete "FexCo1-x ($60 \leqq x \leqq 75$ wt %)" and insert --$Fe_xCo_{100-x}$ ($60 \leqq x \leqq 75$ wt%)-- in its place. |
| Col. 10, Line 14 | Delete "bcc(100)" and insert --bcc(110)-- in its place. |
| Col. 8, Line 15 | Delete "1 nm" and insert --1 µm-- in its place. |
| Col. 8, Line 24 | Delete "bcc(100)" and insert --bcc(110)-- in its place. |

In the Claims:

| | |
|---|---|
| Col. 8, Line 67, Claim 1 | Delete "FexCo1-x ($60 \leqq x \leqq 75$ wt %)" and insert --$Fe_xCo_{100-x}$ ($60 \leqq x \leqq 75$ wt%)-- in its place. |
| Col. 9, Line 16, Claim 2 | Delete "FexCo1-x ($60 \leqq x \leqq 75$ wt %)" and insert --$Fe_xCo_{100-x}$ ($60 \leqq x \leqq 75$ wt%)-- in its place. |

Signed and Sealed this

Tenth Day of November, 2009

David J. Kappos
*Director of the United States Patent and Trademark Office*